(12) United States Patent
Ding

(10) Patent No.: US 12,054,926 B1
(45) Date of Patent: Aug. 6, 2024

(54) FAUCET WITH SPLIT-TYPE DOUBLE-HANDLE

(71) Applicant: Danxuan Ding, Ningbo (CN)

(72) Inventor: Danxuan Ding, Ningbo (CN)

( * ) Notice: Subject to any disclaimer, the term of this patent is extended or adjusted under 35 U.S.C. 154(b) by 0 days.

(21) Appl. No.: 18/510,641

(22) Filed: Nov. 15, 2023

(30) Foreign Application Priority Data

Sep. 26, 2023 (CN) .......................... 202322635353.6

(51) Int. Cl.
*E03C 1/04* (2006.01)
*F16K 31/60* (2006.01)

(52) U.S. Cl.
CPC .......... *E03C 1/0412* (2013.01); *E03C 1/0403* (2013.01); *F16K 31/602* (2013.01)

(58) Field of Classification Search
CPC ..................................................... E03C 1/0412
USPC ............................................................ 4/695
See application file for complete search history.

(56) References Cited

U.S. PATENT DOCUMENTS

| 8,991,425 B2 * | 3/2015 | DeVries | E03C 1/0403 4/695 |
| 2011/0073205 A1 * | 3/2011 | Marty | E03C 1/0403 137/801 |
| 2019/0178403 A1 * | 6/2019 | Crowe | F16K 27/02 |

* cited by examiner

Primary Examiner — Lauren A Crane

(57) ABSTRACT

A faucet with split-type double-handle includes: a water outlet assembly, a control unit and a pipeline connecting assembly. The water outlet assembly includes a water outlet pipe and a mounting structure for fixing the water outlet pipe. The control unit includes two handle assemblies, each including a handle, a mounting base, a plastic core base, a plastic valve core and a compressing member. The plastic core base includes a fluid inlet port and a fluid outlet port. The mounting base is non-rotatably sleeved outside the plastic core base. The compressing member is connected to the plastic core base and presses the plastic valve core in the plastic core base. The plastic valve core is rotatable but not axially movable relative to the core base. The handles are connected to the plastic valve core. The pipeline connecting assembly includes two fluid outlet pipes both connected to the water outlet pipe.

20 Claims, 8 Drawing Sheets

FAUCET WITH SPLIT-TYPE DOUBLE-HANDLE

TECHNICAL FIELD OF THE INVENTION

The present disclosure relates to the technical field of faucets, in particular to a faucet with split-type double-handle.

BACKGROUND OF THE INVENTION

At present, the double-handle faucets on the market are usually equipped with two control valves, one for controlling hot water and the other for controlling cold water. Due to the independent setting of the cold and hot water switches, they are favored by users for their convenient operation. To prevent excessive heavy metals in water, traditional faucets mostly use copper or stainless steel materials to achieve the goal of lead-free. However, copper and stainless steel have higher prices, high production costs, and long production times, resulting in high costs and low product competitiveness. And at the hot control valve end, the water temperature is too high and easy to scald, and when the temperature is below 0° C., both hot and cold valve cores are very easy to freeze and crack, and the cold and hot valve cores are susceptible to corrosion and failure due to the influence of water quality.

SUMMARY OF THE INVENTION

In order to overcome the shortcomings of the existing technology, the present disclosure aims to provide a faucet with split-type double-handle, which has good anti-scalding and anti-freeze-cracking effect, and has low production cost and high corrosion resistance.

The purpose of the present disclosure is realized by using the following technical solution:

A faucet with split-type double-handle, comprising:

A water outlet assembly, including a water outlet pipe and a mounting structure for fixing the water outlet pipe;

A control unit, including two handle assemblies separated from the water outlet assembly, the handle assemblies comprising a handle, a mounting base, a plastic core base, a plastic valve core (i.e. plastic cartridge), and a compressing member respectively, the plastic core base being provided with a fluid inlet port and a fluid outlet port, the mounting base being sleeved on the outside of the plastic core base, the mounting base and the plastic core base being non-rotatable in relation to each other, the compressing member being connected to the plastic core base and the compressing member being adapted to compress the plastic valve core in the plastic core base, the plastic valve core being rotatable relative to the plastic core base, but not axially movable relative to the plastic core base, the handle being connected to the plastic valve core and the handle being capable of operating the plastic valve core to rotate to control a connection/disconnection between the fluid inlet port and fluid outlet port;

A pipeline connecting assembly, comprising two fluid outlet pipes, one end of each of the two fluid outlet pipes being connected to the fluid outlet ports of each of the two plastic core bases, and a second end of each of the two fluid outlet pipes being connected to the water outlet pipe.

Further, the water outlet pipe comprises a water outlet bending pipe, a plastic connecting pipe, and a bubbler (i.e. aerator), the bubbler is provided at the water outlet end of the water outlet bending pipe, the first end of the plastic connecting pipe is connected to the water inlet end of the water outlet bending pipe, and the second ends of both of the fluid outlet pipes are connected to the second end of the plastic connecting pipe; the mounting structure comprises a first sleeve and a first locking nut, the first sleeve is located and sleeved outside of the plastic connecting pipe, and the first sleeve is connected to the water inlet end of the water outlet bending pipe in a threaded manner, and the first locking nut is connected to the outside of the first sleeve in a threaded manner.

Further, the water inlet end of the water outlet bending pipe is provided with an annular groove, the annular groove is located outside the first sleeve, and a first O-ring is arranged in the annular groove.

Further, the water outlet bending pipe and the first sleeve are made of stainless steel.

Further, the faucet with split-type double-handle further comprises a decorative cover, the decorative cover is sleeved outside the mounting base, the compressing member and the plastic valve core, the decorative cover and the mounting base are not rotatable relative to each other, and the handle is partially extended into the decorative cover to connect with the plastic valve core.

Further, the plastic core base is connected to the mounting base and compressing member in a threaded manner, respectively.

Further, the faucet with split-type double-handle further comprises a second sleeve, the second sleeve is sleeved outside the plastic core base and the second sleeve is connected to the mounting base in a threaded manner, an outer thread of the second sleeve is connected to a second locking nut.

Further, the second sleeve is made of stainless steel.

Further, the handle is connected to the plastic valve core by means of a plastic transmission member, the plastic transmission member is located in the decorative cover and is adapted to be pressed against the plastic valve core by the decorative cover, the plastic transmission member is connected to the handle by means of a screw, a friction washer is provided between the handle and the decorative cover in order to avoid direct contact between the handle and the decorative cover; a second O-ring is provided on a portion of the handle which extends into the decorative cover.

Further, an annular trench is provided on the mounting surface of the mounting base, and a third O-ring is provided in the annular trench.

Compared with the existing technology, the present disclosure has the following advantageous effects:

the plastic core base and the plastic valve core can play the role of heat insulation, that is, when the hot water flows in through the fluid inlet port and then flows out from the fluid outlet port, the plastic core base and the plastic valve core can block the heat and reduce the heat transferred to the handle, so as to reduce the risk of scalding. At the same time, the plastic core base and the plastic valve core are made of plastic, so they have better elasticity, when the temperature is below zero degrees Celsius, it is not easy to freeze and crack, to ensure the reliability of use. In addition, the plastic core base and the plastic valve core compared to metal valve core, its cost is lower, and its oxidation corrosion resistance is better, safer to use.

In the figures: 1, water outlet assembly; 11, water outlet pipe; 111, water outlet bending pipe; 1111, annular groove; 112, plastic connecting pipe; 113, bubbler (aerator); 12, mounting structure; 121, first sleeve; 122, first locking nut; 2, control unit; 21, handle assembly; 211, handle; 212, mounting base; 2121, annular trench; 2122, limiting groove; 2123, second limiting plane; 213, plastic core base; 2131, fluid inlet port; 2132, fluid outlet port; 2133, limiting protrusion; 214, plastic valve core (plastic cartridge); 215, compressing member; 216, second locking nut; 3, Pipeline connecting assembly; 31, fluid outlet pipe; 41, first O-ring; 42, third O-ring; 43, lock washer (Anti Loosening Washer); 44, second O-ring; 5, decorative cover; 51, first limiting plane; 6, second sleeve; 7, plastic transmission member; 8, screw; 9, friction washer; 100, hot water pipe; 110, cold water pipe.

DETAILED DESCRIPTION OF THE PREFERRED EMBODIMENT

In order to facilitate the understanding of the present disclosure, the present disclosure will be more fully described below with reference to the relevant accompanying drawings. Preferred embodiments of the present disclosure are given in the accompanying drawings. However, the present disclosure can be realized in many different forms and is not limited to the embodiments described herein. Rather, these embodiments are provided to enable a more thorough and comprehensive understanding of the disclosure of the present disclosure.

It is noted that when an element is said to be "fixed to" another element, it may be directly on the other element or there may be an intermediate element. When an element is said to be "connected" to another element, it may be directly connected to the other element or there may be an intermediate element. The terms "vertical", "horizontal", "left", "right" and similar expressions are used herein for illustrative purposes only.

Unless otherwise defined, all technical and scientific terms used herein have the same meaning as commonly understood by those skilled in the art of the present disclosure. Terms used herein in the specification of the present disclosure are for the purpose of describing specific embodiments only and are not intended to limit the present disclosure. The term "and/or" as used herein includes any and all combinations of one or more of the relevant listed items.

Figure 1:
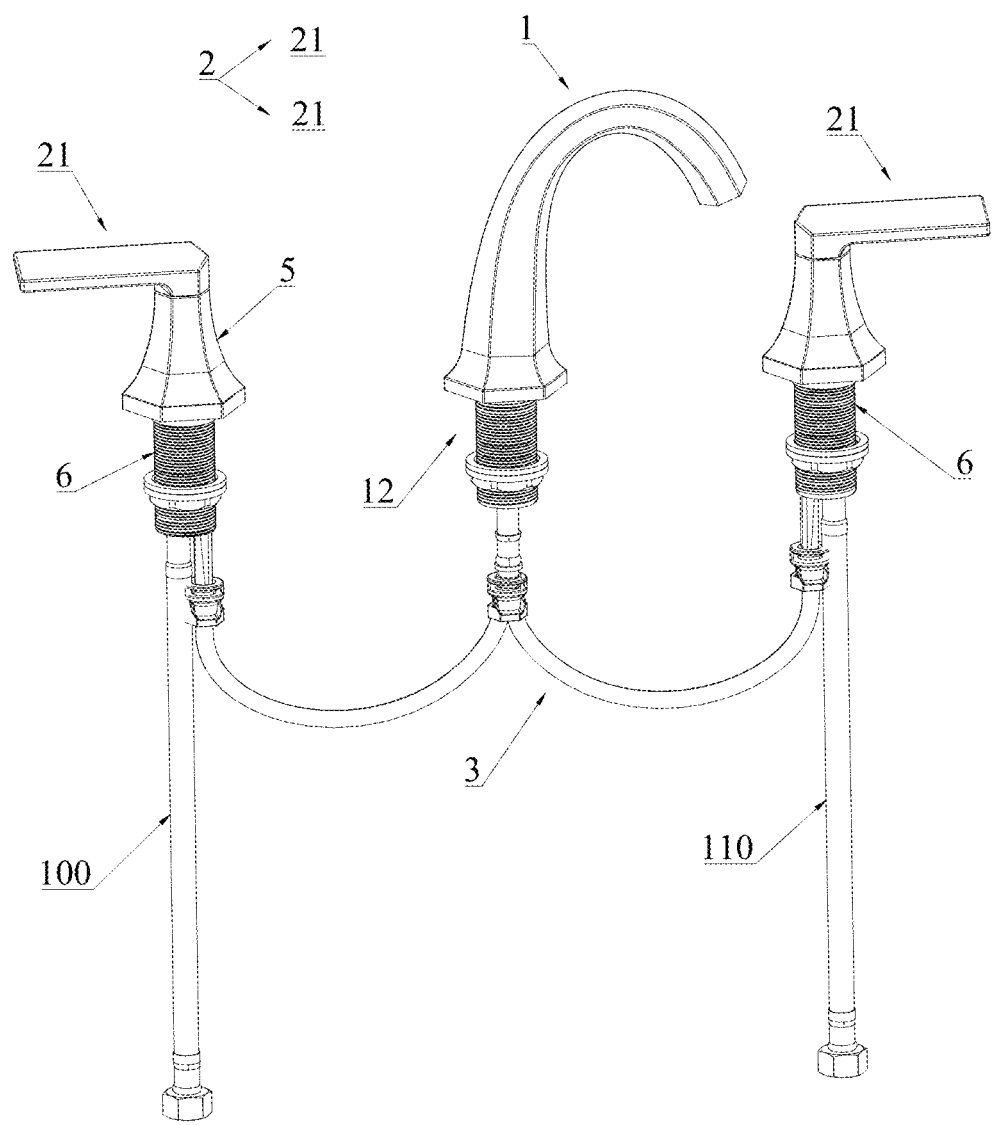
FIG. 1 shows a three-dimensional schematic diagram of the faucet with split-type double-handle of the present disclosure.
Figure 2:
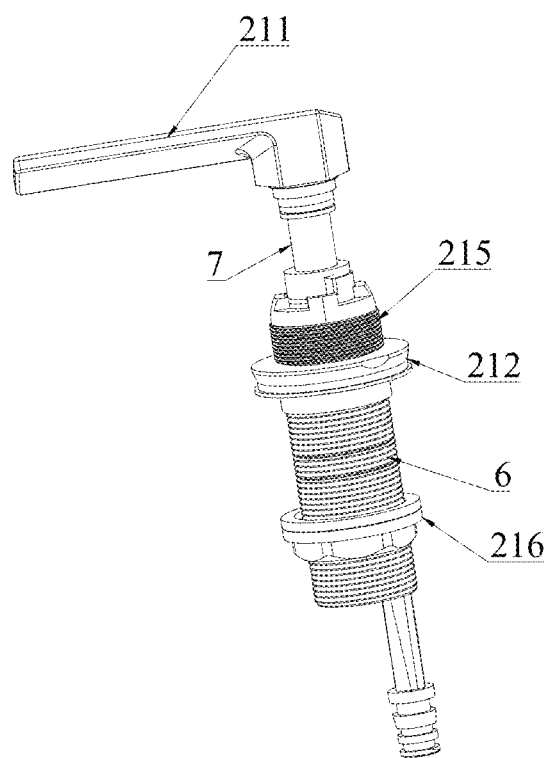
FIG. 2 shows a schematic diagram of the coordination between the handle assembly and the mounting structure in FIG. 1.

Referring to FIG. 1, there is shown a faucet with split-type double-handle provided by an embodiment of the present disclosure, which includes at least a water outlet assembly 1, a control unit 2, and a pipeline connecting assembly 3.

Figure 3:
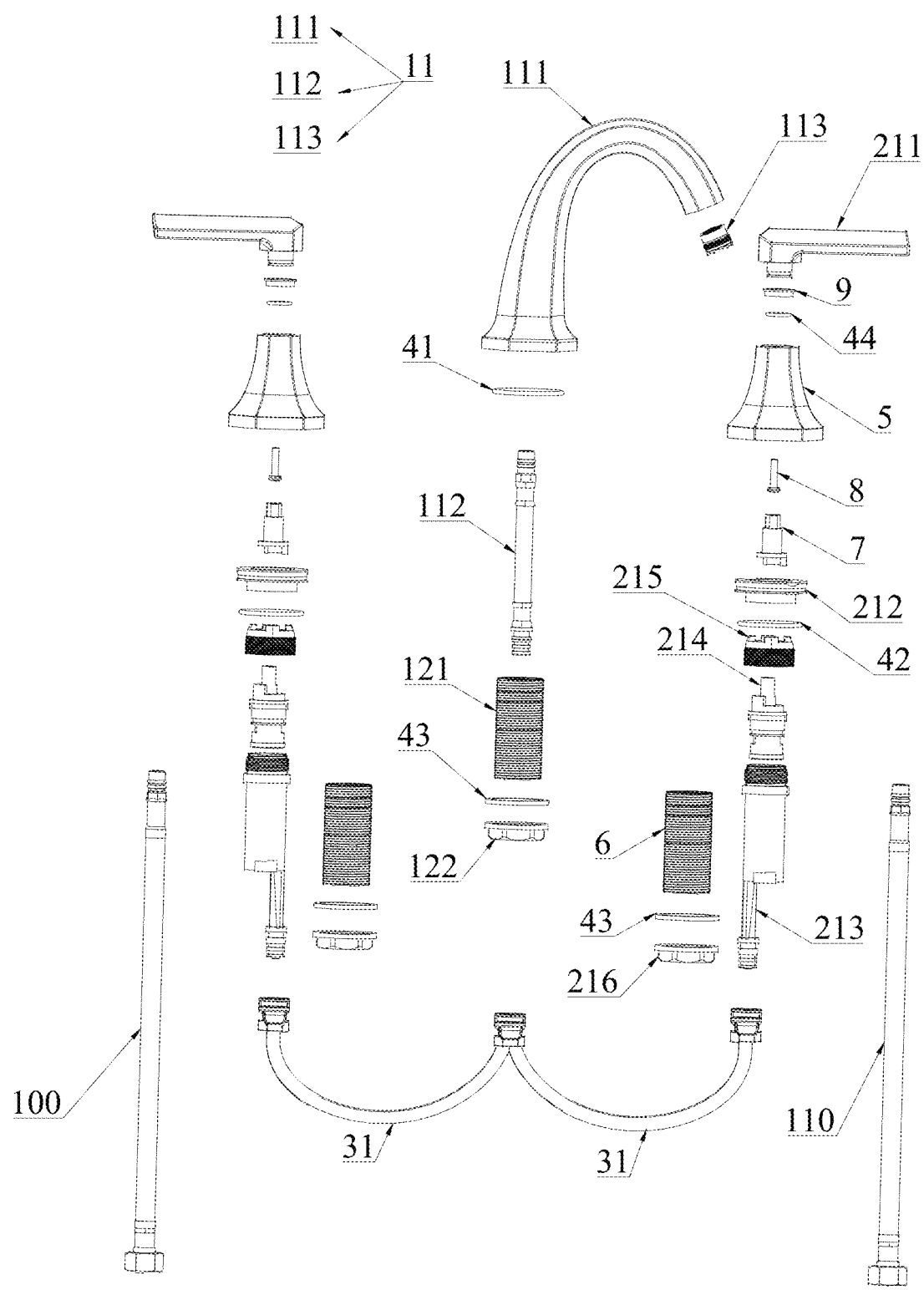
FIG. 3 shows an exploded view of FIG. 1.
Figure 4:
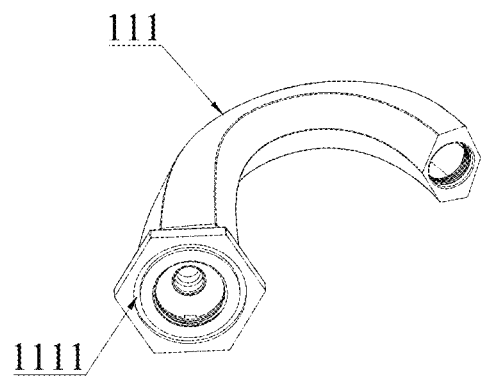
FIG. 4 shows a three-dimensional view of the water outlet bending pipe in FIG. 1.
Figure 5:
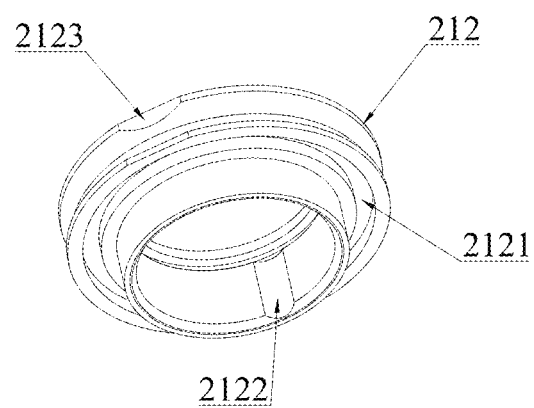
FIG. 5 shows a three-dimensional view of the mounting base in FIG. 1.
Figure 6:
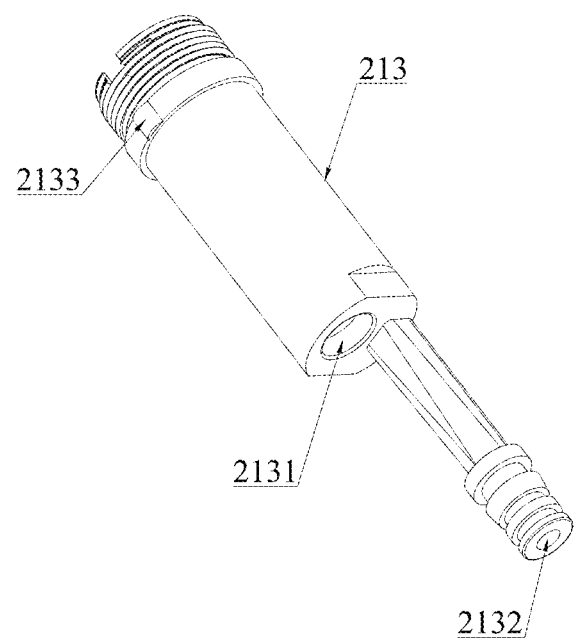
FIG. 6 shows a three-dimensional view of the plastic core base of FIG. 1.

Wherein, with reference to FIG. 1 as well as FIGS. 3-4, the water outlet assembly 1 comprises a water outlet pipe 11 and a mounting structure 12 for fixing the water outlet pipe 11, and specifically, the mounting structure 12 can mount the water outlet pipe 11 on a basin. Referring to FIGS. 2-3 and FIGS. 7-8, the control unit 2 comprises two handle assemblies 21 arranged separately from the water outlet assembly 1, the handle assemblies 21 comprising a handle 211, a mounting base 212 arranged above the basin, a plastic core base 213, a plastic valve core 214 and a compressing member 215 respectively; generally, the plastic core base 213 is arranged underneath the basin, a hole is reserved on the basin for the plastic core base 213 to pass through. The plastic core base 213 and the plastic valve core 214 can be made of PPA plastic. Referring to FIG. 6, the plastic core base 213 is provided with an fluid inlet port 2131 and an fluid outlet port 2132, the mounting base 212 is sleeved set on the outside of the plastic core base 213 and the two cannot be rotated relative to each other, in particular, referring to FIG. 5, a limiting groove 2122 is provided inside the mounting base 212, and a limiting protrusion 2133 is provided outside the plastic core base 213. When the limiting projection 2133 is located in the limiting groove 2122, the limiting function is realized, so that the two cannot rotate relative to each other, and at the same time, it is also convenient for alignment installation. The compressing member 215 is connected with the plastic core base 213 and the compressing member 215 is suitable for compressing the plastic valve core 214 in the plastic core base 213, and the plastic valve core 214 can be rotated relative to the plastic core base 213, but cannot be axial move relative to the plastic core base 213. The handle 211 is connected to the plastic valve core 214, and the handle 211 is capable of operating the plastic valve core 214 to rotate, specifically to rotate 90° to control a connection/disconnection between the fluid inlet port 2131 and the fluid outlet port 2132. The Pipeline connecting assembly 3 includes two fluid outlet pipes 31, one end of the two fluid outlet pipes 31 is connected to the fluid outlet ports 2132 of the two plastic core bases 213, and the second ends of the two fluid outlet pipes 31 are both connected to the water outlet pipe 11.

In actual use, the fluid inlet port 2131 of one of the plastic core bases 213 is connected to an external hot water pipe 100, and the fluid inlet port 2131 of the other of the plastic core bases 213 is connected to an external cold water pipe 110, so as to realize the hot water and/or the cold water entering into the water outlet pipe 11 via the fluid outlet pipe 31 by operating the handle 211. It is to be clarified that, when the hot water and the cold water enter into the water outlet pipe 11 at the same time, i.e. mixing of hot and cold water can be realized, at which time the water outlet pipe 11 can dispense warm water.

In the above-described setting, the plastic core base 213 and the plastic valve core 214 can play the role of heat insulation, i.e., when the hot water flows in through the fluid inlet port 2131 and then flows out from the fluid outlet port 2132, the plastic core base 213 and the plastic valve core 214 can block the heat and reduce the heat transferred to the handle 211, thereby reducing the risk of scalding. At the same time, the plastic core base 213 and the plastic valve core 214 have better elasticity because they are made of plastic, and when the temperature is below zero degrees Celsius, they are not easy to freeze and crack, which ensures the reliability of use. In addition, the plastic core base 213 and the plastic valve core 214 have a lower cost compared to a metal valve core, and their oxidation and corrosion resistance is better, making them safer to use.

As a preferred embodiment, referring to FIG. 3, the water outlet pipe 11 includes a water outlet bending pipe 111, a plastic connecting pipe 112 and a bubbler 113, the plastic connecting pipe 112 can play a role in saving production costs, the bubbler 113 is set at the water outlet end of the water outlet bending pipe 111, and by setting up the bubbler 113, the water flow can be made softer, reducing the impact, and enhancing the experience of using the water. The first end of the plastic connecting pipe 112 is connected to the water inlet end of the water outlet bending pipe 111, and the second ends of the two fluid outlet pipes 31 are connected to the second end of the plastic connecting pipe 112; the mounting structure 12 comprises a first sleeve 121 and a first locking nut 122, the first sleeve 121 is sleeved on the outside of the plastic connecting pipe 112, and the first sleeve 121 is threadedly (in a threaded manner) connected to the water inlet end of the water outlet bending pipe 111, and the first locking nut 122 is connected to the outside of the first sleeve 121 in a threaded manner. The first sleeve 121 can play a role in protecting the plastic connecting pipe 112.

The principle of the mounting structure 12 fixing the water outlet pipe 11 is as follows: the water outlet bending pipe 111 is set above the basin, the plastic connecting pipe 112 passes from below the basin through the hole reserved on the basin and is connected to the water outlet bending pipe 111, the first sleeve 121 is sleeved set on the outside of the plastic connecting pipe 112, and the first sleeve 121 and the water outlet bending pipe 111 are connected in a threaded manner, then the first locking nut 122 is screwed so that it moves along the first sleeve 121 towards the water outlet bending pipe 111 until the basin is clamped by the first locking nut 122 and the water outlet bending pipe 111. In order to further ensure the locking effect of the first locking nut 122, a lock washer 43 can be provided between the first locking nut 122 and the water outlet bending pipe 111.

Preferably, referring to FIGS. 3 and 4, the water inlet end of the water outlet bending pipe 111 is provided with an annular groove 1111, the annular groove 1111 is located on the outer side of the first sleeve 121, and a first O-ring 41 is provided in the annular groove 1111. The first O-ring 41 can play a cushioning role, so that the water outlet bending pipe 111 does not come into direct contact with the basin when it is installed to avoid touching and damaging the basin.

Preferably, the water outlet bending pipe 111 and the first sleeve 121 are made of stainless steel. The water outlet bending pipe 111 being made of stainless steel ensures structural strength and reliability of use, while the first sleeve 121 being made of stainless steel can further play a role in protecting the plastic connecting pipe 112.

Figure 9:
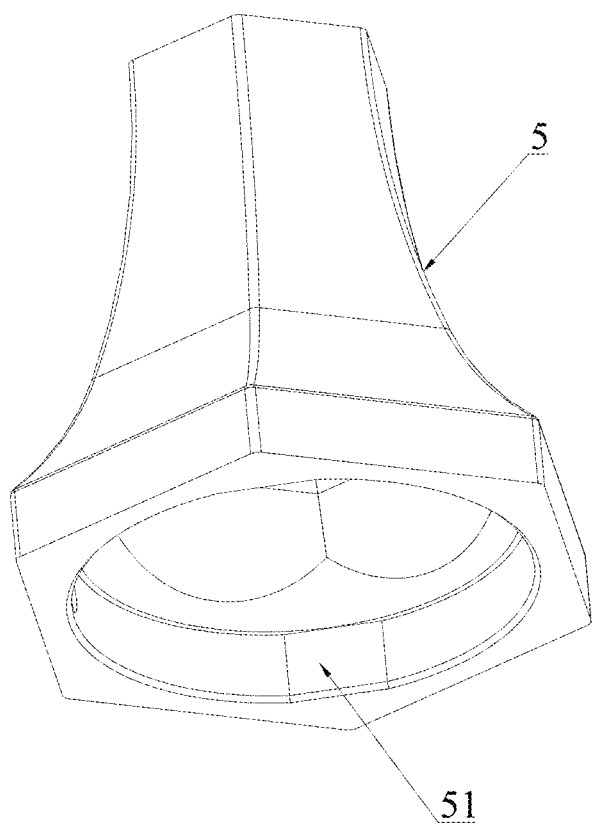
FIG. 9 shows a schematic view of the decorative cover of FIG. 1.

Preferably, with reference to FIG. 1 and FIG. 3, the faucet with split-type double-handle also includes a decorative cover 5, the decorative cover 5 is sleeved set on the outer side of the mounting base 212, the compressing member 215 and the plastic valve core 214, and the decorative cover 5 is not rotatable relative to the mounting base 212. Referring to FIG. 5 and FIG. 9, a first limiting plane 51 can be provided inside the decorative cover 5, and a second limiting plane 2123 can be provided outside the mounting base 212, and a limiting function is realized when the first limiting plane 51 and the second limiting plane 2123 fit together, so that the two of them cannot be rotated relative to each other and at the same time, it is easy for an alignment Installation. The handle 211 is inserted partially into the decorative cover 5 and connected to the plastic valve core 214. The decorative cover 5 can cover the mounting base 212, the compressing member 215 and the plastic valve core 214, so that the faucet with split-type double-handle of the present disclosure is more beautiful, and at the same time, the decorative cover 5 can also play a role in protecting the plastic valve core 214 to a certain extent to extend its service life.

Preferably, the plastic core base 213 is connected to the compressing member 215 in a threaded manner, and the threaded connection can be easily disassembled.

Preferably, referring to FIG. 3, the faucet with split-type double-handle further comprises a second sleeve 6, the second sleeve 6 is sleeved arranged outside of the plastic core base 213 and the second sleeve 6 is connected to the mounting base 212 in a threaded manner, an outer thread of the second sleeve 6 is connected to a second locking nut 216. Similarly, the handle assembly 21 can be fixed to the basin by means of the second sleeve 6 as well as the second locking nut 216. Specifically, the second locking nut 216 is screwed and is moved towards the mounting base 212 to be clamped fixed on the basin. To further ensure the locking effect of the second locking nut 216, a lock washer 43 can also be provided between the second locking nut 216 and the mounting base 212.

In order to ensure the reliability of the installation of the plastic core base 213 and to reduce the risk of it being damaged due to external impact, the second sleeve 6 is set to be made of stainless steel.

Figure 7:
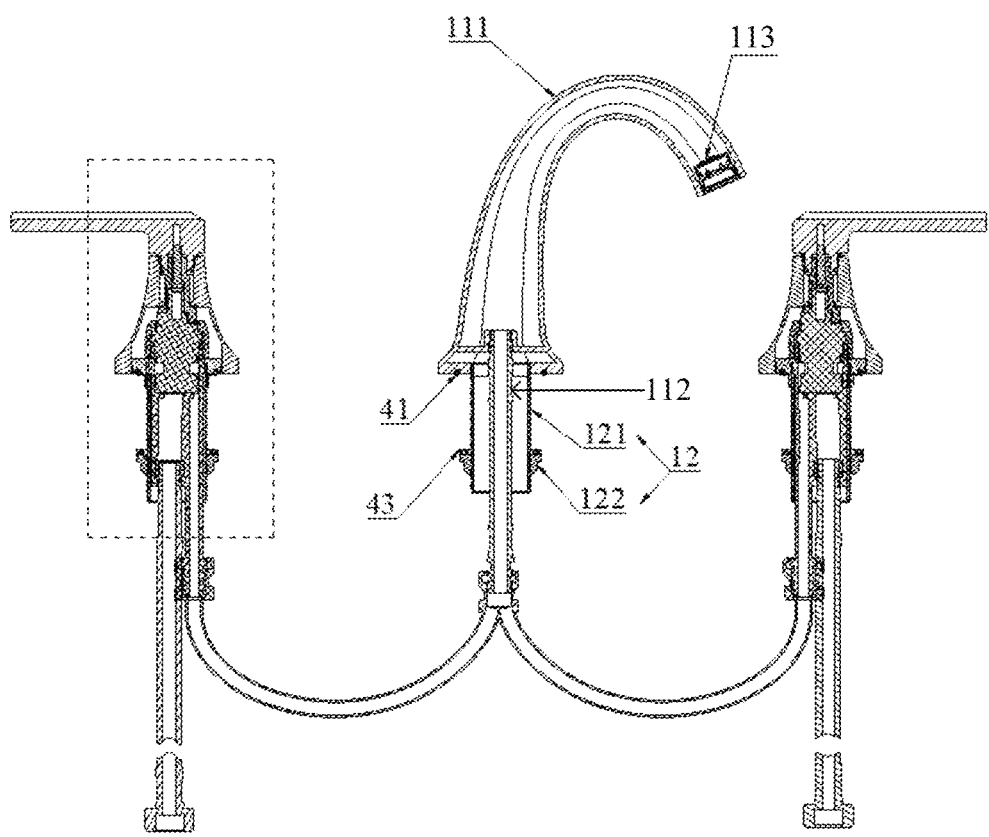
FIG. 7 shows a sectional view of FIG. 1.
Figure 8:
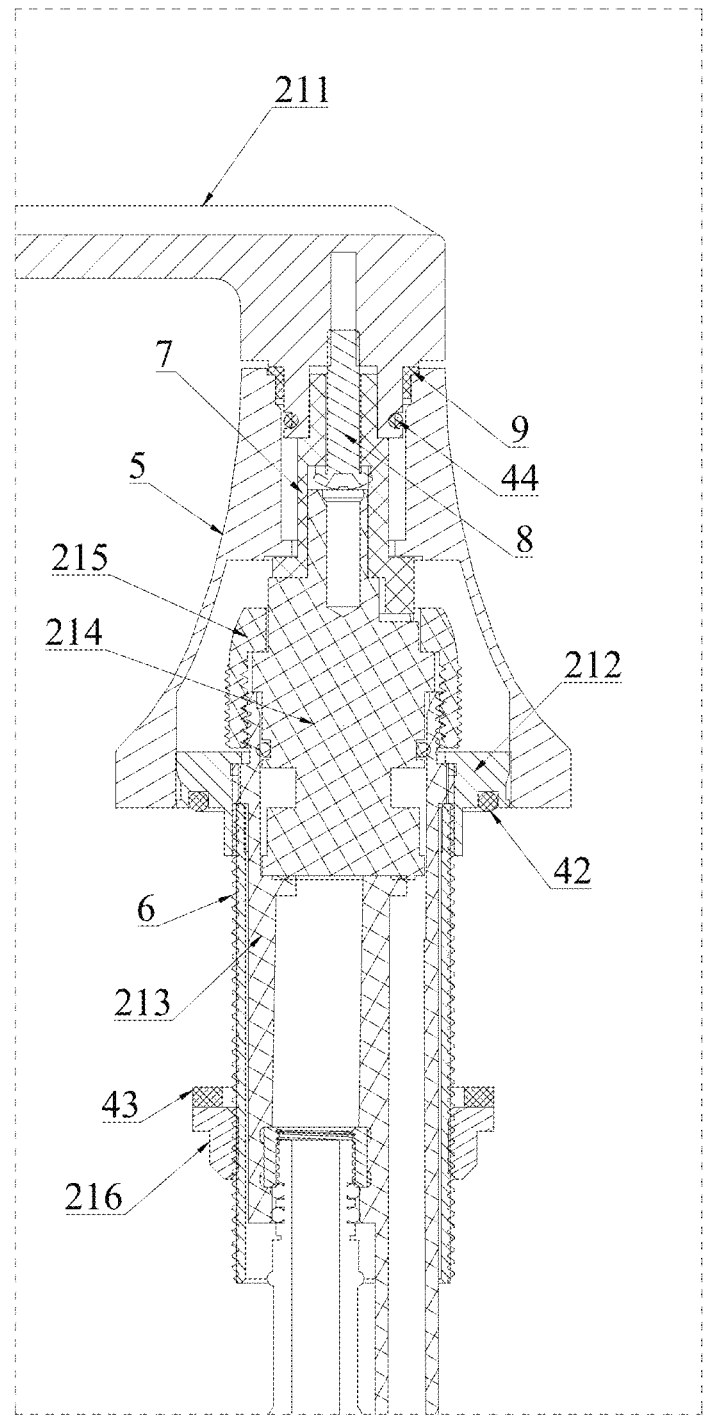
FIG. 8 shows an enlarged view of the dashed box in FIG. 7.

Preferably, with reference to FIG. 3 and FIGS. 7-8, the handle 211 is connected to the plastic valve core 214 via a plastic transmission member 7, the plastic transmission member 7 is arranged within the decorative cover 5 and adapted to be pressed against the plastic valve core 214 by the decorative cover 5, and the plastic transmission member 7 is connected to the handle 211 via a screws 8. A friction washer 9 is provided between the handle 211 and the decorative cover 5, the friction washer 9 is used to avoid the direct contact between the handle 211 and the decorative cover 5, and the part of the handle 211 that extends into the decorative cover 5 is provided with a second O-ring. That is, when the handle 211 and the plastic transmission member 7 are installed on the decorative cover 5, the friction washer 9 is used to avoid direct contact between the two, thus reducing wear and tear, and at the same time, the friction washer 9 can to a certain extent improve the feeling of using the handle 211, and the plastic transmission member 7 is located in the decorative cover 5 and is suitable for being pressed on the plastic valve core 214 by the decorative cover 5, so as to avoid the handle 211 falling off from the decorative cover 5 and to ensure the reliability of use. The part of the handle 211 that extends into the decorative cover 5 is provided with a second O-ring 44, by means of which the sealing effect between the handle 211 and the decorative cover 5 can be strengthened.

Preferably, with reference to FIGS. 3 and 5, an annular trench 2121 is provided on the mounting surface (i.e., the side facing the basin) of the mounting base 212, and a third O-ring 42 is provided in the annular trench 2121. By providing the third O-ring 42, it can serve as a cushioning effect, so that the mounting base 212 does not directly contact the basin when mounted, thereby avoiding bruising the basin.

The above is only an embodiment of the present disclosure, not to limit the patent scope of the present disclosure, where the equivalent structure or equivalent process transformation based on the specification and the accompanying drawings of the present disclosure, or directly or indirectly used in other related technical fields, are included in the patent protection scope of the present disclosure.

The invention claimed is:

1. A faucet with split-type double-handle, comprising:
a water outlet assembly, including a water outlet pipe and a mounting structure for fixing the water outlet pipe;
a control unit, including two handle assemblies separated from the water outlet assembly, the handle assemblies comprising a handle, a mounting base, a plastic core base, a plastic valve core, and a compressing member respectively, the plastic core base being provided with a fluid inlet port and a fluid outlet port, the mounting base being sleeved on the outside of the plastic core base, the mounting base and the plastic core base being non-rotatable in relation to each other, the compressing member being connected to the plastic core base and the compressing member being adapted to press the plastic valve core in the plastic core base, the plastic valve core being rotatable relative to the plastic core base, but not axially movable relative to the plastic core base, the handle being connected to the plastic valve core and the handle being capable of operating the plastic valve core to rotate to control a connection/disconnection between the fluid inlet port and fluid outlet port; and
a pipeline connecting assembly, comprising two fluid outlet pipes, a first end of each of the two fluid outlet pipes being connected to the fluid outlet port of a corresponding one of the two plastic core bases, and a second end of each of the two fluid outlet pipes being connected to the water outlet pipe,
wherein the water outlet pipe comprises a water outlet bending pipe, a plastic connecting pipe and a bubbler, the bubbler is provided at a water outlet end of the water outlet bending pipe, a first end of the plastic connecting pipe is connected to a water inlet end of the water outlet bending pipe, and a second end of the plastic connecting pipe is connected to the second ends of the two fluid outlet pipes,
the water outlet bending pipe is made of stainless steel.

2. The faucet with split-type double-handle according to claim 1, wherein the mounting structure comprises a first sleeve and a first locking nut, the first sleeve is located and sleeved outside of the plastic connecting pipe, and the first sleeve is connected to the water inlet end of the water outlet bending pipe in a threaded manner, and the first locking nut is connected to the outside of the first sleeve in a threaded manner, and the first sleeve is made of stainless steel.

3. The faucet with split-type double-handle according to claim 2, wherein the water inlet end of the water outlet bending pipe is provided with an annular groove, the annular groove is located outside the first sleeve, and a first O-ring is arranged in the annular groove.

4. The faucet with split-type double-handle according to claim 1, wherein the faucet with split-type double-handle further comprises a decorative cover, the decorative cover is sleeved outside the mounting base, the compressing member and the plastic valve core, the decorative cover and the mounting base are not rotatable relative to each other, and the handle is partially extended into the decorative cover to connect with the plastic valve core.

5. The faucet with split-type double-handle according to claim 1, wherein the plastic core base is connected to the compressing member in a threaded manner.

6. The faucet with split-type double-handle according to claim 5, wherein the faucet with split-type double-handle further comprises a second sleeve, the second sleeve is sleeved outside the plastic core base and the second sleeve is connected to the mounting base in a threaded manner, an outer thread of the second sleeve is connected to a second locking nut.

7. The faucet with split-type double-handle according to claim 6, wherein the second sleeve is made of stainless steel.

8. The faucet with split-type double-handle according to claim 4, wherein the handle is connected to the plastic valve core by means of a plastic transmission member, the plastic transmission member is located in the decorative cover and is adapted to be pressed against the plastic valve core by the decorative cover, the plastic transmission member is connected to the handle by means of a screw, a friction washer is provided between the handle and the decorative cover in order to avoid direct contact between the handle and the decorative cover; a second O-ring is provided on a part of the handle which extends into the decorative cover.

9. The faucet with split-type double-handle according to claim 1, wherein an annular trench is provided on a mounting surface of the mounting base, and a third O-ring is provided in the annular trench.

10. The faucet with split-type double-handle according to claim 4, wherein an inner wall of the decorative cover is provided with a first limiting plane, an outer wall of the mounting base is provided with a second limiting plane, and the first limiting plane is engaged with the second limiting plane to prevent the mounting base and the decorative cover from rotating in relation to each other.

11. The faucet with split-type double-handle according to claim 10, wherein the mounting base comprises a first annular part and a second annular part, the first annular part has a larger diameter than the second annular part, and the second limiting plane is positioned on an outer wall of the first annular part.

12. The faucet with split-type double-handle according to claim 1, wherein an inner wall of the mounting base is provided with a limiting groove, an outer wall of the plastic core base is provided with a limiting protrusion, and the limiting groove is engaged with the limiting protrusion to prevent the mounting base and the plastic core base from rotating in relation to each other.

13. The faucet with split-type double-handle according to claim 12, wherein the mounting base comprises a first annular part and a second annular part, the first annular part has a larger diameter than the second annular part, and the limiting groove is positioned on an inner wall of the second annular part.

14. The faucet with split-type double-handle according to claim 8, wherein an inner wall of the compressing member is engaged with an outer wall of the plastic core base, the compressing member and the plastic core base define a cavity, the plastic valve core is accommodated in the cavity, and the compressing member limits the plastic valve core in a vertical direction.

15. The faucet with split-type double-handle according to claim 14, wherein the mounting base comprises a first through hole, the compressing member has a second through hole aligned with the first through hole, and the plastic transmission member passes through the first through hole and the second through hole and is connected to the plastic valve core.

16. The faucet with split-type double-handle according to claim 2, wherein the first locking nut and the water outlet bending pipe are configured to clamp a basin.

17. The faucet with split-type double-handle according to claim 6, wherein the second locking nut and the mounting base are configured to clamp a basin.

18. The faucet with split-type double-handle according to claim 1, wherein each handle assembly further comprises a decorative cover,
- the mounting base and the compressing member are positioned in a cavity defined by the decorative cover,
- an inner wall of the decorative cover is provided with a first limiting plane, an outer wall of the mounting base is provided with a second limiting plane, and the first limiting plane is engaged with the second limiting plane to prevent the mounting base and the decorative cover from rotating in relation to each other,
- an inner wall of the compressing member is provided with a first thread, an outer wall of the plastic core base is provided with a second thread engaged with the first thread, and
- an inner wall of the mounting base is provided with a limiting groove, the outer wall of the plastic core base is further provided with a limiting protrusion, and the limiting groove is engaged with the limiting protrusion to prevent the mounting base and the plastic core base from rotating in relation to each other.

19. The faucet with split-type double-handle according to claim 18, wherein the second thread is positioned above the limiting protrusion on the outer wall of the plastic core base.

20. The faucet with split-type double-handle according to claim 18, wherein the mounting base comprises a first annular part and a second annular part, the first annular part has a larger diameter than the second annular part, the limiting groove is positioned on an inner wall of the second annular part, and the second limiting plane is positioned on an outer wall of the first annular part.

* * * * *